United States Patent [19]

Miura et al.

[11] Patent Number: 4,617,611
[45] Date of Patent: Oct. 14, 1986

[54] ELECTROLYTIC CAPACITOR

[75] Inventors: Kengi Miura, Kyoto; Norikazu Iida, Uji, both of Japan

[73] Assignee: Matsushita Electric Industrial Co., Ltd., Kadoma, Japan

[21] Appl. No.: 618,400

[22] PCT Filed: Oct. 3, 1983

[86] PCT No.: PCT/JP83/00327
§ 371 Date: Jun. 4, 1982
§ 102(e) Date: Jun. 4, 1984

[87] PCT Pub. No.: WO84/01468
PCT Pub. Date: Apr. 12, 1984

[30] Foreign Application Priority Data

Oct. 4, 1982 [JP] Japan .................. 57-174349

[51] Int. Cl.⁴ ............................................. H01G 9/00
[52] U.S. Cl. ..................................... 361/433; 29/570
[58] Field of Search ................. 361/433, 272; 29/570;
429/53; 220/203, 367; 222/85

[56] References Cited

U.S. PATENT DOCUMENTS 2,492,225 12/1949 Kester ................................. 220/203

FOREIGN PATENT DOCUMENTS 55-164838 11/1980 Japan .
56-35406 4/1981 Japan .
56-51343 5/1981 Japan .

Primary Examiner—L. T. Hix
Assistant Examiner—Douglas S. Lee
Attorney, Agent, or Firm—Cushman, Darby & Cushman

[57] ABSTRACT

The present invention relates to a safety vented structure of an electrolytic capacitor containing a capacitor element (1) in a case (2), wherein a safety vent (7) is constituted by providing on a bottom face of the case (2) a first narrow groove (7a) which passes through the center (P) of the bottom of the case (2) and a second narrow groove (7b) which crosses with right angle the first narrow groove (7a) at a crossing point (Q) outside a winding center part (5) of the capacitor element (1) and is longer than the first narrow groove (7a); thereby short-circuiting which arises at the time of operation of the safety vent is prevented.

4 Claims, 12 Drawing Figures ively large current flows as a result of a circuit trouble the capacitor element is liable to be heated and a large amount of gas is produced, thereby to increase pressure in the case to generalte a danger of explosion.

ELECTROLYTIC CAPACITOR

TECHNICAL FIELD

The present invention relates to an electrolytic capacitor wherein capacitor element is enclosed in a case made of metal.

BACKGROUND ART

Hitherto, in the capacitor of this kind a safety vented structure is necessary, since when an excessively large current flows as a result of a circuit trouble the capacitor element is liable to be heated and a large amount of gas is produced, thereby to increase pressure in the case to generalte a danger of explosion.

As the safety vented structure, generally is adopted such a measure that a safety vent of decreased thickness is provided on sealing member of a sealed case or the case as such, so that, when gas pressure in the case reaches a value immediately before explosion, the safety vent is operated by the gas pressure to discharge the gas, thereby to prevent the explosion before its happening.

FIG. 1 shows representative structure of the sealed type electrolytic capacitor. In the figure, numeral 1 designates a capacitor element soaked with electrolyte, numeral 2 designates a cylindrical case made of metal for enclosing the capacitor element 1, numeral 3 designates a sealing member for sealing an opening part of the case 2, numeral 4 designates terminals fixed to the sealing member 3. The capacitor element 1 is constituted by winding anode foil having anodic oxide film and a cathode foil with electrolytic paper inbetween, and a part designated by dotted lines is winding center part. A safety vent 6 of decreased thickness is provided at the bottom part of the case 2.

As to this safety vent, hitherto various kinds are invented or devised and reduced into practice. FIG. 2A through 2C show one example thereof, and FIG. 2A is a case which provides +* shaped safety groove 6a which crosses at center P of a bottom face of a case 2, FIG. 2B is a case which provides safety groove 6b of V letter shape, and FIG. 2C is a case which provides a ring-shaped safety groove 6c.

Hereupon, when an excessively large current flows as a result of circuit trouble, the capacitor element 1 generates heat, and specially the temperature at the winding center part 5 becomes 10°-20° C. higher than peripheral part. Accordingly, when the safety vent 6 provided at the bottom of the case operates, gas generated in the case is discharged passing almost through the winding center part 5. Since this winding center part 5 has unstable beginning end from which electrode foil and electrolytic paper constituting the capacitor element are started to be wound, it is liable to be deformed, and by gas discharging at operation of the safety vent 6 the winding center part 5 is deformed to be pulled outside. Accordingly, when the safety groove 6a, 6b and 6c operate the capacitor element 1, a part of the winding center part 5 is pulled out as shown in FIGS. 3A, 3B and 3C, thereby to make short-circuiting of anode and cathode of the capacitor element 1, and such a short-circuit accident is generated that a circuit using the electrolytic capacitor is short-circuited thereby to destroy other components, too.

DISCLOSURE OF THE INVENTION

Therefore, the present invention intends to provide electrolytic capacitors wherein in an electrolytic capacitor containing a capacitor element in a case, wherein a safety vent is constituted by providing on a bottom face of the case a first narrow groove which passes through the center of the bottom of the case and a second narrow groove, which crosses with right angle the first narrow groove at a crossing point outside a winding center part of the capacitor element and is longer than the first narrow groove, and thereby even when the safety vent operates the winding center part 5 is not pulled outside, and accordingly, no short-circuit accident arises.

THE BEST MODE FOR EMBODYING THE INVENTION

Figure 4:
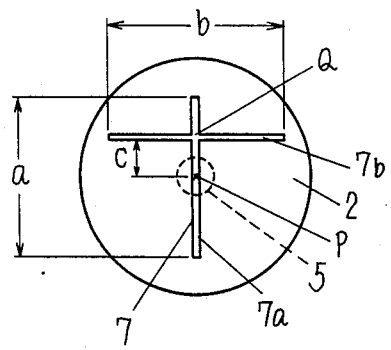
FIG. 4 is a plan view showing a safety vent of an electrolytic capacitor in accordance with one embodiment of the present invention.
Figure 5:
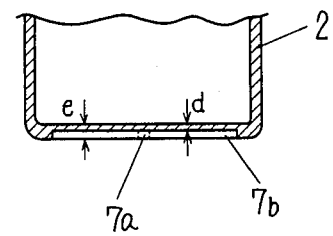
FIG. 5 is a lengthwise cross-sectional view of the same.

FIG. 4 and FIG. 5 show one embodiment of safety vented case of electrolytic capacitor in accordance with the present invention, and in FIG. 4 numeral 7a is linear first narrow groove which passes through the center P of a bottom face of the case 2, numeral 7b is a second narrow groove which crosses the first narrow groove 7a at a cross point Q other than the point P and is equally divided into two parts, and a safety vent 7 is consisted of the first and second narrow grooves 7a, 7b. And, the cross point Q of the first and second narrow grooves 7a, 7b is outside a winding center part 5 of a capacitor element 1. And the second narrow groove 7b is equally divided into two parts at the cross point Q, and the overall length b thereof is designed to be longer than the length a of the first narrow groove 7a.

Figure 6:
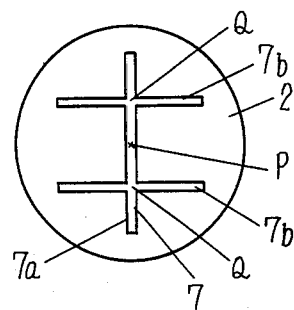
FIG. 6 and FIG. 7 are plan views showing other examples of safety vent of electrolytic capacitors of the present invention, respectively.
Figure 7:
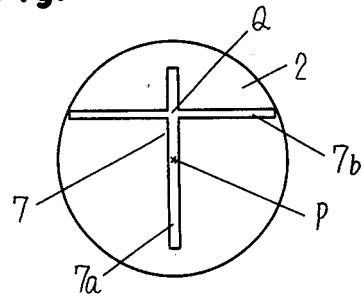

Incidentally, the first narrow groove 7a and the second narrow groove 7b may be provided on either of the inside or outside of the bottom face of the case 2, and as shown in FIG. 6, the second narrow groove 7b may be provided in two lines with respect to the center P as point of symmetry; and furthermore, as shown in FIG. 7 similar effect is obtainable even when the second narrow groove 7b is provided to cross from one end to the other end of the bottom face of the case 2.

By such configuration, the following effects of operation are obtainable:

(1) a position where the safety vent operates by the gas pressure in the case is along the second narrow groove 7b rather than the cross point Q, and is situated outside of the winding center part 5, and accordingly even when the gas blows out the winding center part 5 of the capacitor element 1 is not pulled out outside, and (2) since the configuration of the safety vent is of left-right symmetry, the pressure effectively operates, and reliability of the operation of the safety vent is high, and operation sound of the safety vent is very small.

In order to confirm function and effect of the present invention, experiments are carried out based on the below-mentioned samples. The test method is AC voltage method of EIAJ, RC-3807.

Incidentally, among the below-mentioned Table 1 and Table 3, as shown by FIG. 4 and FIG. 5, "a" is length of the first narrow groove 7a, "b" is length of the second narrow groove 7b, "c" is length between P-Q, "d" is thickness of the narrow grooves, "e" is thickness of bottom face of the case 2, and "F" is operation pressure of the safety vent.

Figure 1:
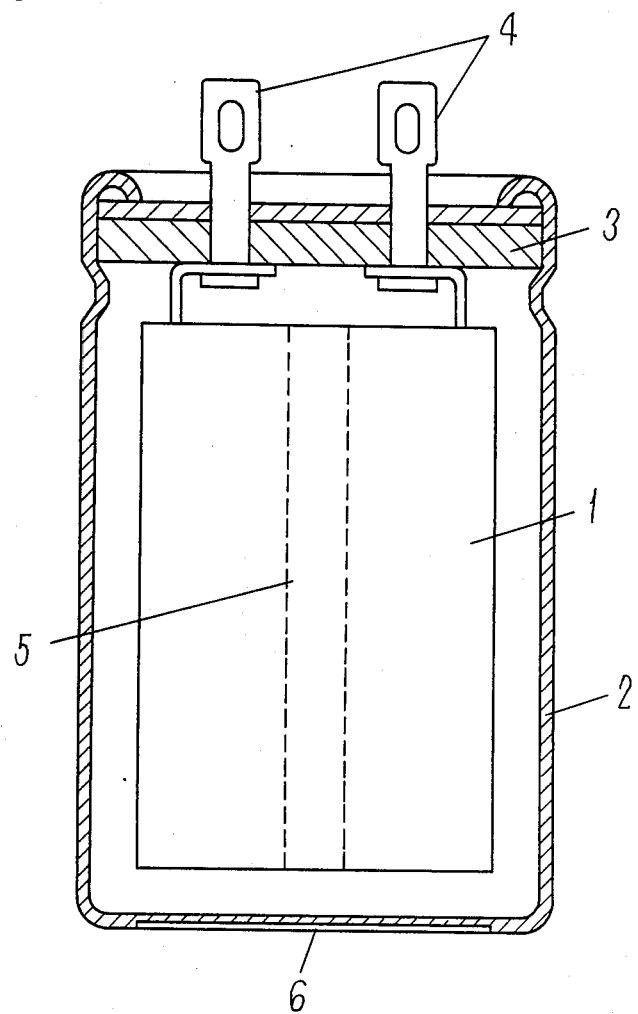
FIG. 1 is the lengthwise cross-sectional view of the general electrolytic capacitor.
Figure 2A:
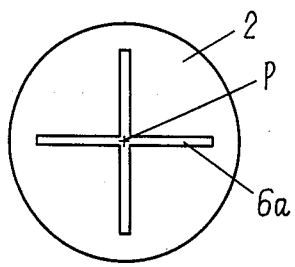
FIGS. 2A through 2C are the plan views showing the safety vent of the conventional electrolytic capacitor.
Figure 2B:
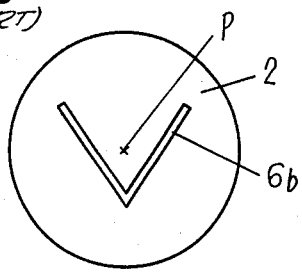
Figure 2C:
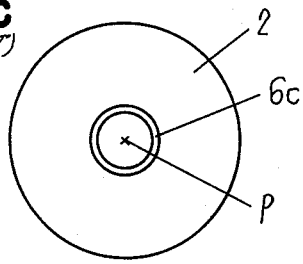

Table 2 is test results of safety vent operation states by the conventional safety vents A, B and C, respectively of FIGS. 2A through 2C.

And, Table 1 and Table 2 are those using as samples the electrolytic capacitors which is of ratings of 200 V, 470 μF, using aluminum case of 30 mm Φ×40 mm as its case, and winding center part of the capacitor element being 6 mm Φ, and numerals of the tables are average value of twenty samples. Table 3 is those using as samples the electrolytic capacitors which is of ratings of 16 V, 2200 μF, using aluminum case of 16 mm Φ×25 mm as its case, and winding center part of the capacitor element being 2 mm Φ, and numerals of the table is average value of twenty samples.

TABLE 1

| No. | a[mm] | b[mm] | c[mm] | d[μ] | e[μ] | F[Kg/cm$^2$] | Rate of short-circuit |
|---|---|---|---|---|---|---|---|
| 1 | 19 | 20 | 5 | 110 | 650 | 10.5 | 0% |
| 2 | 19 | 18 | 5 | 110 | 650 | 11.5 | 20 |
| 3 | 17 | 19 | 5 | 110 | 650 | 11.5 | 0 |
| 4 | 17 | 15 | 5 | 110 | 650 | 12.0 | 25 |
| 5 | 15 | 17 | 5 | 110 | 650 | 12.0 | 0 |
| 6 | 15 | 13 | 5 | 110 | 650 | 13.0 | 30 |

TABLE 2

| No. | Prior art | d[μ] | e[μ] | F[Kg/cm$^2$] | Rate of short-circuit |
|---|---|---|---|---|---|
| 7 | Conventional safety vent A | 110 | 650 | 11.0 | 50% |
| 8 | Conventional safety vent B | 110 | 650 | 11.5 | 80 |
| 9 | Conventional safety vent C | 110 | 650 | 12.5 | 90 |

TABLE 3

| No. | a[mm] | b[mm] | c[mm] | d[μ] | e[μ] | F[Kg/cm$^2$] | Rate of short-circuit |
|---|---|---|---|---|---|---|---|
| 10 | 11 | 12 | 2 | 95 | 450 | 20 | 0% |
| 11 | 11 | 10 | 2 | 95 | 450 | 22 | 30 |

As the numerals of the above-mentioned Table 1, Table 2 and Table 3 show, in those with the conventional safety vents, the rates of short-circuit are generating at a very high probabilities as 50-90%, while No. 1, No. 3, No. 5 and No. 10 of a <b has no short-circuits at all even at safety vent operation. On the other hand, No. 2, No. 4, No. 6 and No. 11 of a >b make short-circuits, 20-30% being pulled out of each one part of the winding center part 5 of the capacitor element 1.

Figure 8:
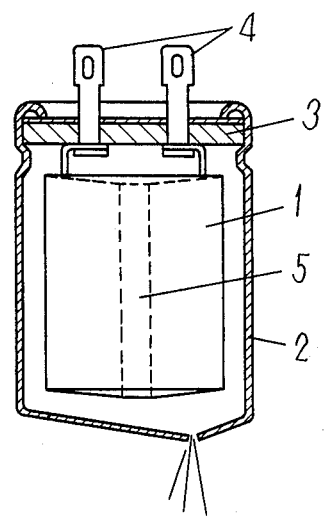
FIG. 8 is a lengthwise cross-sectional view showing a state when a safety vent of an electrolytic capacitor of the present invention.

That is, in No. 1, No. 3, No. 5 and No. 10 of a <b, their second narrow grooves 7b are largely cut and capacitor element 1 at the operation of the safety vent becomes as shown by FIG. 8, and winding center part 5 is not positioned at the operation position of the safety vent, and accordingly the winding center part 5 of the capacitor element 1 is not pulled outside and no short-circuit is produced. However, in the cases of No. 2, No. 4, No. 6 and No. 11 of a >b, the first narrow groove 7a is cut from the cross point Q, and hence operation position of the safety vent nears to the winding center part 5, and accordingly the winding center part of the capacitor element 1 is liable to be pulled out, and rate of generation of the short-circuit becomes high.

Figure 3A:
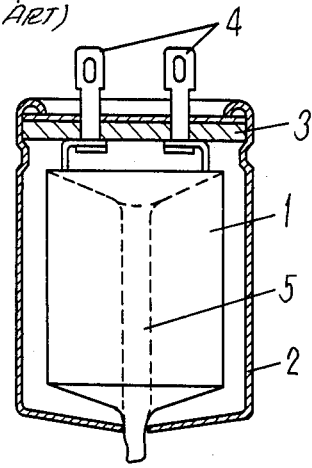
FIGS. 3A through 3C are lengthwise cross-sectional views showing the states of the electrolytic capacitors when the coventional safety vent works.
Figure 3B:
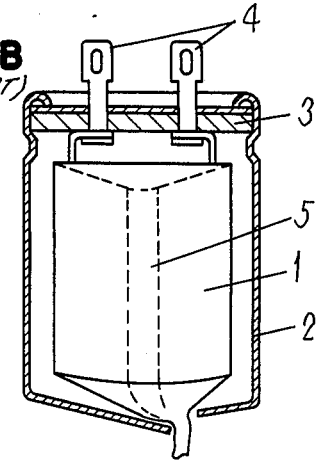
Figure 3C:
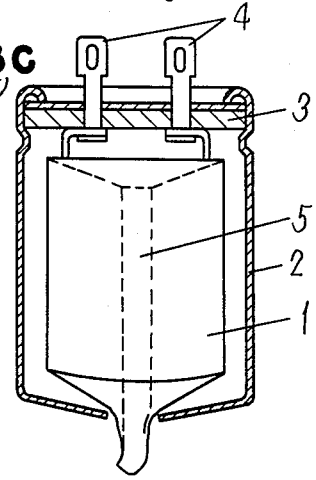

As has been described, in the present invention the defects which the conventional safety vents of FIG. 2 and FIG. 3 have had are dissolved, and it is experimentally confirmed that the purpose of the invention is achieved.

Incidentally, although in the safety vent of the present invention the operation effect of the safety vent is the same even when the decreased thickness parts are provided on the inside part or outsidepart of the bottom face of the case, in case the decreased thickness part is on outside there is a liability that a protrusion or the like directly strikes the decreased thickness part, thereby to damage the decreased thickness part; and therefore it is dedirable that the decreased thickness part is on the inside as shown by FIG. 5.

And it is necessary that the second narrow groove 7b should be longer than the first narrow groove 7a, and difference between the length is desirably more than 1 mm when considering working accuracy in case of providing the narrow grooves.

POSSIBLE UTILIZATION IN INDUSTRY

As has been described in the above, according to the electrolytic capacitor of the present invention, by making safety vent by providing on a bottom face of a case, a first narrow groove which passes through the center of the bottom of the case and a second narrow groove which crosses with right angle the first narrow groove at crossing point outside a winding center part of the capacitor element, and is longer than the first narrow groove; and thereby, operation position of the safety vent is not at a position of the winding center part which is largest of deformation against deformation of the capacitor element at the time of operation of the safety vent, and accordingly generation of short-circuit trouble by pulling outside of the winding center part is prevented; and thereby even when the electrolytic capacitor is destroyed, there is no generation of damaging other components.

We claim:

1. An electrolytic capacitor containing a capacitor element in a case, wherein a safety vent is constituted by providing on a bottom face of said case a first narrow straight groove which passes through the center of said bottom face of said case and a second said first narrow groove between the ends thereof at a crossing point outside a winding center part of said capacitor element and is longer than said first narrow groove.

2. An electrolytic capacitor in accordance with claim 1, wherein said second groove is provided in a manner to be equally divided into two parts at said crossing point with said first narrow groove.

3. An electrolytic capacitor in accordance with claim 1, wherein said first narrow groove and said seoond narrow groove are provided by forming decreased thickness parts, inside of said bottom face.

4. An electrolytic capacitor in accordance with claim 1, wherein difference of lengths of said first narrow groove and said second narrow groove is made above 1 mm.

* * * * *